Oct. 20, 1925.
A. L. PARRISH
1,557,770
BRAKE OPERATING DEVICE FOR TRAILERS
Filed March 31, 1923 2 Sheets-Sheet 1
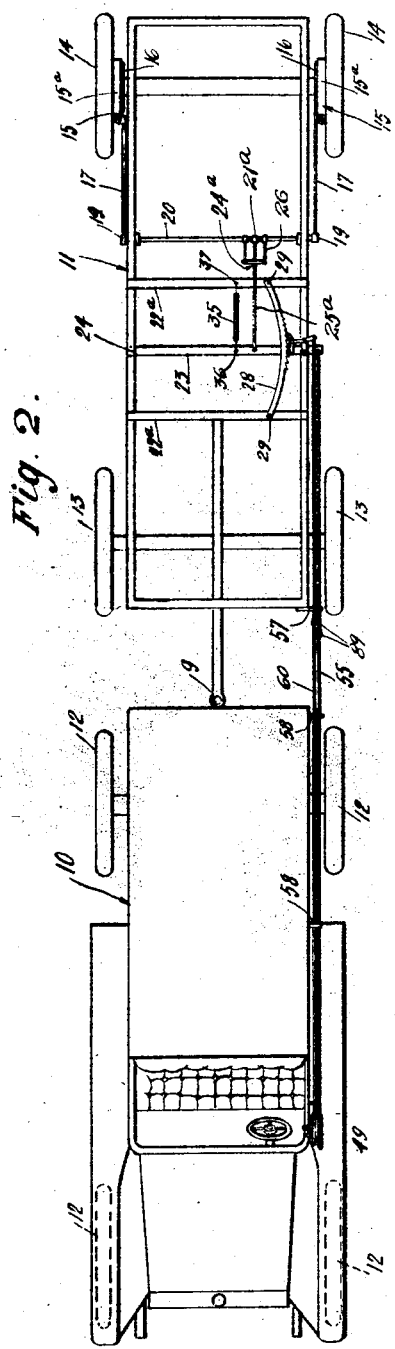
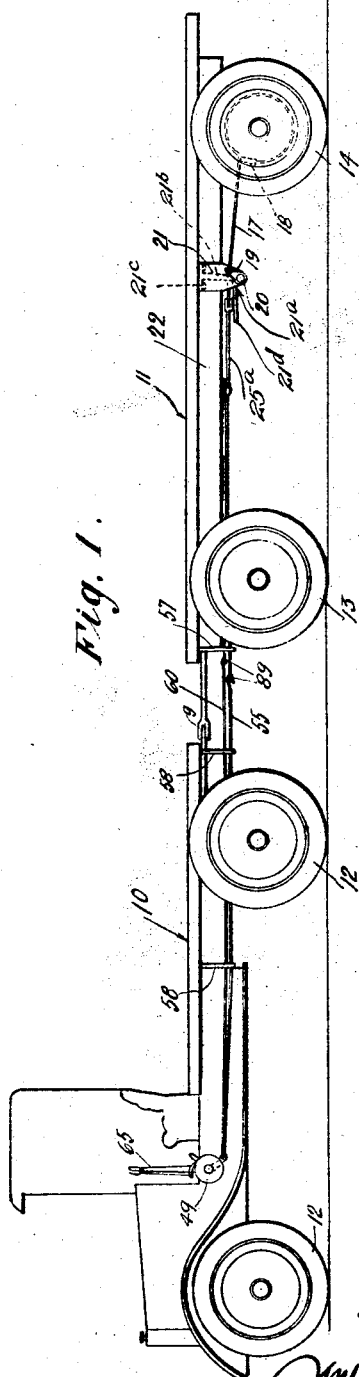
Inventor
Andrew L. Parrish.
his Attorney.

Oct. 20, 1925.  1,557,770
A. L. PARRISH
BRAKE OPERATING DEVICE FOR TRAILERS
Filed March 31, 1923 2 Sheets-Sheet 2

Inventor
Andrew L. Parrish
his Attorney.

Patented Oct. 20, 1925.

1,557,770

UNITED STATES PATENT OFFICE.

ANDREW L. PARRISH, OF LONG BEACH, CALIFORNIA.

BRAKE-OPERATING DEVICE FOR TRAILERS.

Application filed March 31, 1923. Serial No. 629,032.

*To all whom it may concern:*

Be it known that I, ANDREW L. PARRISH, a citizen of the United States, residing at Long Beach, in the county of Los Angeles and State of California, have invented new and useful Improvements in Brake-Operating Devices for Trailers, of which the following is a detailed specification.

It is a well established principle that each unit in a train of joined vehicles should be provided with independent braking means controllable from the leading unit of the train. However, the extent of application of this principle in the automobile trailer field has been very limited, due mainly to the lack of efficient trailer brake control mechanism. The consequent widespread use of unbraked, and therefore uncontrolled automobile trailers, has developed into more or less of a traffic menace. In checking the speed of such trailers, the entire braking strain of the train is concentrated on the brake drums of the leading vehicle, a strain which often results in accident. In other words, the fact that one unit of the train is out of control, may easily result in throwing the entire train out of control.

Many different means for coupling leaders and trailers have been devised, but the constant tendency of unbraked trailers to "creep up" on the leader when the speed of the latter is checked, causes undue and excessive wear on the coupling, no matter how excellent the design of such coupling may be.

Therefore, it is my principal purpose to provide novel, practical and efficient means operable from the leading vehicle for bringing automobile trailers under the complete control of an operator on the leading vehicle.

It is further one of my objects to provide a flexible trailer brake controlling means whereby relative lateral, vertical or swinging movement between leader and trailer will not interfere with the effective operation of the trailer brakes.

Further objects of my invention will be more particularly described in connection with the accompanying drawings and detailed description.

In the drawings:

Fig. 1 is a side elevation of an automobile truck and trailer coupled to form a train, showing my device attached thereto;

Fig. 2 is a top plan view of Figure 1;

Figure 3:
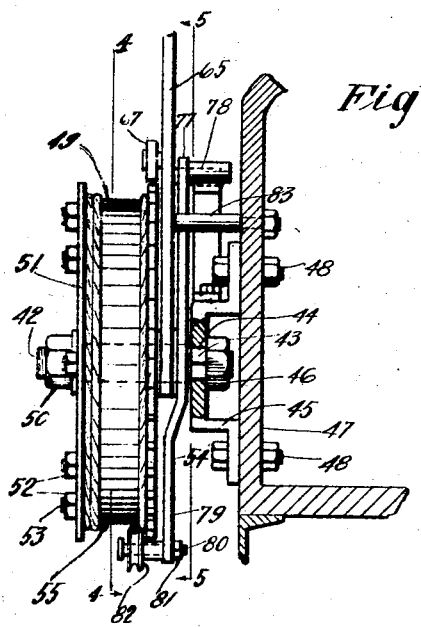
Fig. 3 is a view showing a method of mounting the winding drum of my device.

For the purpose of illustration, I have shown my brake controlling means as being attached to and extending between an automobile truck 10 (hereafter referred to as the leading vehicle or leader) coupled at 9 to a four-wheeled trailer 11, but it will be understood that the invention may be applied between a tractor or other type of leading vehicle and any of the well known types of trailers, such as the two-wheeled "dolly" or the four-wheeled tracking truck. I have indicated at 12 the usual truck traction wheels, while the forward and rear wheels of trailer 11 are designated at 13 and 14, respectively.

In general, a practical embodiment of my invention comprises the provision of three connected groups of associated elements, each group performing a distinct function in the braking operation. The first group comprises brake bands co-acting in the usual manner with brake drums on the trailer wheels or axle and operative connections between such brake bands and the second group which comprises brake applying, setting and releasing means carried by the trailer. The third group consists of controlling means located on the leading vehicle and operative connections between the control means and the aforementioned second group.

Trailer brakes generally indicated at 15 may consist of brake bands 15ª adapted to frictionally co-act in the usual manner with brake drums 16 carried by trailer wheels 14. Pull rods 17 are operatively connected to bands 15ª by such means as cranks 18 whereby longitudinal movement of the pull rods shifts bands 15ª with respect to drums 16 to cause brake application or release. Rods 17 are connected to cranks 19 mounted on co-axial rock shafts 20 and 20ª, the inner ends of the shafts meeting and having bearing in angle member 21ª (the vertical leg 21ᵇ of which is attached to the trailer frame at 21ᶜ, for instance) and the outer ends of the shafts being journaled in the hangers 21 depending from the side frame members 22 of trailer 11. The elements just described are more or less conventionally shown, since they may vary considerably in construction to fit the various types of trailers. Brakes 15 may be of any desired type such as internal-expanding or external-contracting.

A lever or brake-bar 23 is fulcrumed at 24 to frame 22 and is connected to rock-shafts 20 and 20ª by such means as the equalizer generally indicated at 24ª whereby radial movement imparted to lever 23 rocks shafts 20 and 20ª. Equalizer 24ª includes pull rod 25ª which is pivotally connected at one end to the center of bar 25 and at the other end to lever 23. Links or rods 26 are pivotally connected to bar 25 and the shaft carried cranks 27, the bar being adapted to slide over horizontal leg 21ᵈ of member 21ª when pull rod 25ª is reciprocated during oscillatory movement of lever 23.

A locking bar 28 constructed in the form of a notched sector is secured to cross frame members 22ª at 29 in concentric relation to the fulcrum point 24 and is arranged to be traversed by lever 23 when the latter is radially moved.

A pawl 30 is pivotally arranged with respect to lever 23 as at 31 and is normally held in engagement with sector teeth 32 by such means as spring 33 which is secured to lever 23 as at 34. The co-action of spring 33 with pawl 30 normally allows a clockwise movement of lever 23 with respect to fulcrum point 24 and prevents a counterclockwise movement thereof.

A contractile spring 35 extending between and having its opposite ends secured to lever 23 and one of the cross members 22ª at 36 and 37 respectively, tends to swing lever 23 in a counter-clockwise direction, the brakes 15 being in full release when lever 23 is at the limit of its counter-clockwise travel.

Bell crank 38, having one arm 39 thereof fulcrumed to lever 23 at 40, is pivotally connected at 41 to pawl 30 in such a manner that clock-wise movement of crank 38 retracts pawl 30 against the tension of spring 33 from engagement with ratchet or sector teeth 32.

The free extremity of lever 23 may have a supporting and sliding engagement with one of the frame members 22.

I will now describe the controlling means mounted on truck 10. Stub shaft 42 is provided with a squared or otherwise mutilated portion 43 extending through an aperture 44 of registering outline provided in bracket 45, a nut 46 threaded on shaft 42 serving to clamp the shaft to the bracket. Bracket 45 may be secured to body 47 of truck 10 by such means as bolts 48.

A hollow drum 49 is rotatably mounted on shaft 42, being retained thereon by nut 50 threaded on the free extremity of shaft 42. A cover plate 51 is removably secured to drum 49 by such means as nuts 52 threaded on bolts 53, which bolts extend from the opposite side plate 54.

A brake applying cable 55 has one extremity thereof fastened to the lever 23 as at 56 whence it passes through guide clip or loop 57 on trailer 11 and similar clips 58 provided on truck 10. The cable is then preferably given one or more turns about drum 49 and its extremity passed through an aperture 59 in the face of drum 49 and secured to one of the bolts 53 as at 53ª

One extremity of a brake releasing cable 60 is fastened to bell crank 38 as at 61. Cable 60 thence passes through guides 57 and 58 to drum 49, about which it may be given one or more turns, after which the extremity is passed through drum face aperture 59 and fastened to drum bolt 53ª.

A spiral spring 62 is arranged within drum 49, one extremity of said spring being anchored at 63 to the fixed shaft 42 and the opposite extremity being secured at 64ª to drum bolt 53ᵇ. In assembling the drum 49 and spring 62 and operatively connecting the cables 55 and 60 to the drum, spring 62 is placed under an initial tension adapted to impart a constant tendency on the part of drum 49 to rotate on shaft 42 in a clockwise direction.

Spring 62 is relatively weak with respect to spring 35, but is of sufficient strength to compensate for any relative movement between truck 10 and trailer 11 by yielding or taking-up to maintain cables 55 and 60 comparatively taut. Spring 62 also serves as a slack take-up means during the operation of the device as hereinafter described. The strength of spiral spring 62 is greater than that of spring 33, for a reason which will later be apparent.

Drum 49, or the plate 54 carried thereby, is provided with the peripheral teeth 64. An operating lever 65 is journaled on shaft 42 adjacent the drum 49, the swinging movement of said lever being limited by stop 66 projecting laterally from truck body 47, since drum 49 and lever 65 are each independently rotatable on shaft 42, they may be described as normally relatively rotatable or movable.

A driving pawl 67 is pivoted on lever 65 at 68 and is adapted to co-act with teeth 64. A pull rod 69 having a grasping handle 70 is linked to lever 65 as at 71 and passes through a guide strap 72 secured to lever 65 at 73. The lower extremity of rod 69 is pivotally connected to pawl 67 as at 74. Pawl 67 is normally held out of engagement with teeth 64 by means of an expansive spring 75 which encircles rod 69 and is interposed between guide 72 and the pawl 67.

A brake releasing lever 76 is journaled on shaft 42 intermediate the lever 65 and bracket 45 and is preferably constructed in the form of a bell crank, one arm 77 of which terminates in a pedal 78 and the other arm 79 carries a pin 80 secured thereto by nut 81. A grooved roller 82 is rotatably mounted on pin 80 and is capable of a slight lateral sliding movement thereon in order to allow said roller to follow cable 60 as it is being wound or unwound with respect to drum 49.

Figure 5:
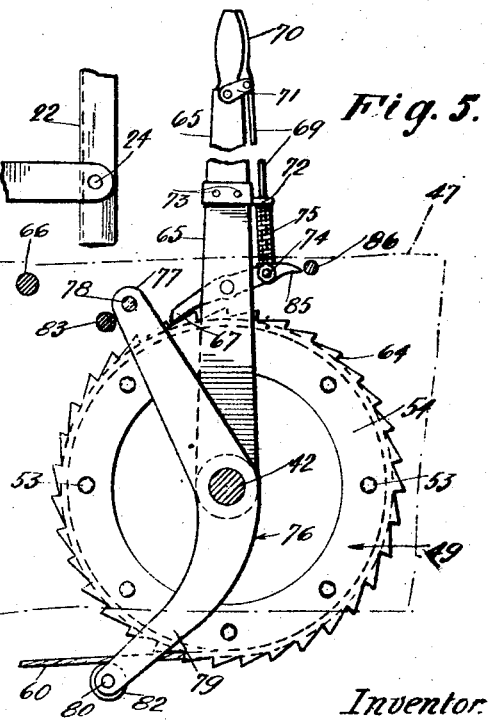
Fig. 5 is a section on line 5—5 of Figure 3 showing the drum rotating pawl in operative engagement with the drum.

Roller 82 is immediately superposed by the cable 60 and is normally maintained in light engagement therewith, a stop 83 carried by body 47 performing this function by limiting the counter-clockwise movement of lever 76 as viewed in Figure 5.

Assuming that the brakes 15 are released and the truck operator desires to make a trailer brake application, he will grasp the lever 65, including in his grasp the handle 70, thus drawing such handle towards the lever 65. This action, through the medium of link 71 and rod 69, results in pawl 67 being forced into engagement with teeth 64 as clearly illustrated in Fig. 5, the pawl thus functioning as releasable means for interconnecting lever 65 and drum 49 to hold them against relative rotation or movement.

By then imparting a clockwise swing (Fig. 4) to lever 65, pawl 67 rotates drum 49 in a clockwise direction, thus winding the cable 55 and 60 onto drum 49, the spiral spring 62 aiding rather than resisting such clockwise rotation.

Figure 6:
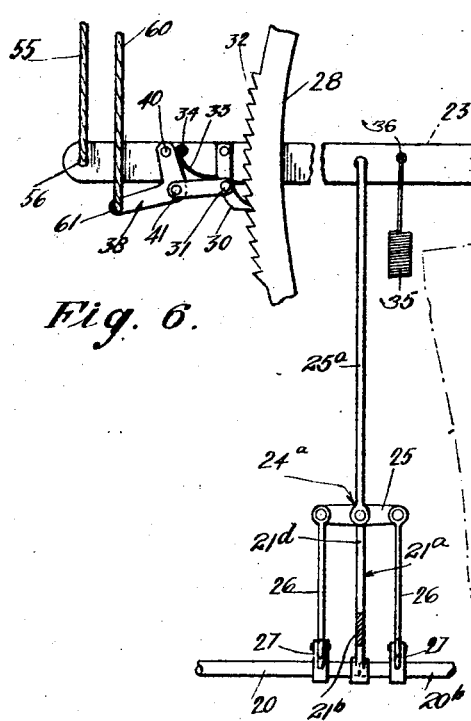
Fig. 6 is an enlarged, fragmentary plan view of that portion of my device attached to the trailer.

The just-described winding up of cable 55 causes a consequent clockwise swing of lever 23 (as viewed in Fig. 6) and thus serves to apply brakes 15 through the medium of equalizer 24ª, rock shafts 20 and 20ª, cranks 19 and pull rods 17.

Since release cable 60 is traveling or being wound on drum 49 with a speed exactly equal to that of applying cable 55, there is no consequent relative movement between bell crank 38 and lever 23, pawl 30 being left free to ratchet over sector teeth 32.

Upon securing the desired degree of brake application, the truck operator is free to release his grasp on lever 65 and handle 70, whereupon spring 75 serves to withdraw pawl 67 from engagement with teeth 64. However, the engagement of pawl 30 with sector teeth 32 prevents the counter-clockwise movement (Fig. 6) of lever 23 and hence the brake application is automatically maintained. Spiral spring 62 maintains cables 55 and 60 in a relatively taut condition after the operator loosens his grasp on handle 70.

When it is desired to release the brakes 15, the operator exerts a foot pressure on pedal 78, thus swinging release lever 76 in a counter-clockwise direction (as viewed in Figure 4) and swinging roller 82 upwardly to exert an additional tension on release cable 60, cable 55 being unaffected by such movement. Continued pressure on pedal 78 results in shortening the effective length of cable 60, or, in other words, exerts a pull or additional take-up on said cable. Since the inertia of drum 49 and the spring 62 tends to resist a counter-clockwise (Fig. 4) rotation of drum 49, the spring 33 must yield, allowing bell crank 38 to be pulled in a clockwise direction (Fig. 6) and causing the retraction of pawl 30 from engagement with sector 32. Spring 35 then acts to swing lever 23 in a counter-clockwise direction (Fig. 6) to brake-release position, during which swinging movement cable 55 revolves drum 49 in a counter-clockwise direction (Fig. 4) against the tension of spiral spring 62.

When foot-pressure against pedal 78 is relieved by the operator, release lever 76 is swung in a clockwise direction (Fig. 4) by gravity, thus relieving the cable 60 from the additional tension and allowing spring 33 to again cause co-action between pawl 30 and sector 28. The brake control mechanism is thus returned to normal, brake-release position, ready to be actuated to cause a succeeding brake application.

Figure 4:
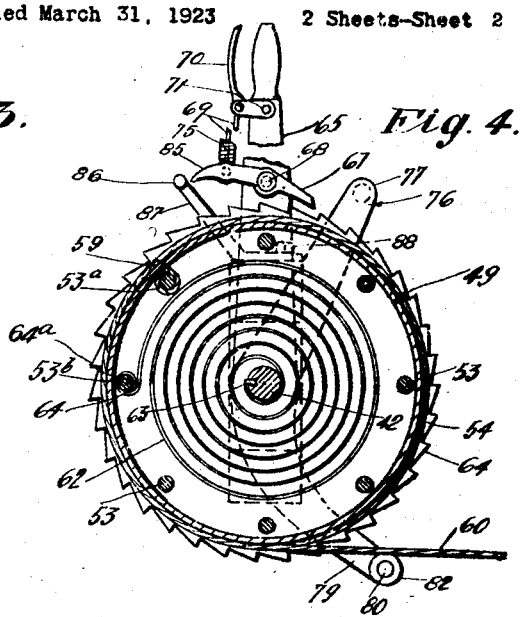
Fig. 4 is a section on line 4—4 of Figure 3.

I have provided a safeguard for positively disengaging pawl 67 from teeth 64 under certain conditions. For this purpose, I have extended pawl 67 to form a nose cam 85 and have positioned a bar 86 in the path of cam 85 by means of a standard 87, the latter being adjustably secured to bracket 45 by bolt 88. As truck 10 is turned to the right (Fig. 2) the distance between drum 49 and lever 23 is increased over that of normal since the change of direction of the trailer is delayed with respect to that of the forward end of truck 10 where the drum 49 is located. Spring 62 yields to the resulting increased tension, drum 49 being coincidently revolved in a counter-clockwise direction (Fig. 4). Should it happen that the operator were applying the trailer brakes 15 during such a period, it will be seen that such drum rotation would, through the co-action of teeth 64 and pawl 67 swing lever 65 in a counter-clockwise direction against the pull exerted by the operator thereon.

Such opposed effort might readily result in accident to the drum mechanism or the operator's hand were it not for the provision of nose 85 and bar 86. However, the co-action caused between such nose and bar during such movement of lever 65 rotates pawl 67 about pivot 68 and thus positively retracts said pawl from engagement with teeth 64, preventing further movement of the lever 65 but allowing drum 49 to further revolve.

Since it is customary to uncouple trucks and trailers during the loading and unloading of the trailers, it is desirable that the trailer brake connections extending between truck and trailer be readily disengaged and re-engaged. Therefore, cables 55 and 60 are provided with hook and eye connections 89 whereby they may be parted to allow the uncoupling of the trailer from the truck. The hook and eye terminals may then be looped through guides 57 and 58 to temporarily support the free ends of cables 55 and 60 and retain them readily accessible for reuniting.

It will be understood that a plurality or series of trailers similar to 11 may be coupled behind leader 10 with independent brake applying apparatus, similar to that just described, mounted on each trailer all of such apparatus being operatively connected to one or more control drums mounted on the leader.

While I have herein described a preferred embodiment of my invention, I do not wish to be limited thereto except for such limitation as a fair interpretation of the appended claims may impart.

Having described a preferred form of my invention, I claim:

1. In combination with a leading vehicle and a trailer coupled thereto, brakes operatively connected to the wheels of the trailer, brake applying means carried by said trailer and connected to said brakes, brake setting means on said trailer adapted to co-act with said applying means to retain brake application, control means carried by said leading vehicles and adapted to be selectively operated, a flexible member operatively connecting to said applying means and said control means, means on said trailer adapted to release said setting means, a second flexible member connecting said releasing means and said control means whereby selective actuation of the control means is adapted to operate said applying and releasing means selectively, and yieldable take-up means for maintaining the two flexible members in taut condition.

2. In combination with a leading vehicle and a trailer coupled thereto, brakes operatively connected to the wheels of the trailer, brake applying means carried by said trailer and connected to said brakes, brake control means carried by said leading vehicle, flexible means operatively connecting said applying means to said control means, and yieldable take-up means adapted to co-act with said control means in a manner to retain said flexible means in a taut condition.

3. In combination with a leading vehicle and a trailer coupled thereto, brakes operatively connected to the wheels of the trailer, brake applying means carried by said trailer and connected to said brakes, brake control means carried by the leading vehicle, brake setting means on said trailer adapted to co-act with said applying means to retain brake application, means on said trailer adapted to release said setting means, flexible means operatively connecting said applying means and said control member, further flexible means operatively connecting said releasing means and said control means, and yieldable take-up means adapted to co-act with said control means in a manner to retain said flexible means in a taut condition.

4. In combination with a leading vehicle and a trailer coupled thereto, brakes operatively connected to the wheels of the trailer, a brake lever fulcrumed on said trailer and connected to said brakes, means adapted to yieldably maintain said lever in brake-release position, a drum rotatably mounted on the leading vehicle, a cable connecting said drum and said lever, and means for rotating said drum to take up said cable in a manner to swing said lever into brake-applying position.

5. In combination with a leading vehicle and a trailer coupled thereto, brakes operatively connected to the wheels of the trailer, a brake lever fulcrumed on said trailer and connected to said brakes, means adapted to yieldably maintain said lever in brake-release position, a drum rotatably mounted on the leading vehicle, a cable connecting said drum and said lever, means for rotating said drum to take up said cable in a manner to swing said lever into brake-applying position, a locking bar on said trailer, and setting means carried by said lever adapted to co-act with said locking bar in a manner to retain said lever in brake applying position.

6. In combination with a leading vehicle and a trailer coupled thereto, brakes operatively connected to the wheels of the trailer, a brake lever fulcrumed on said trailer and connected to said brakes, means adapted to yieldably maintain said lever in brake-release position, a drum rotatably mounted on the leading vehicle, a cable connecting said drum and said lever, means for rotating said drum to take up said cable in a manner to swing said lever into brake-applying position, a locking bar on said trailer, setting means carried by said lever adapted to co-act with said locking bar in a manner to retain said lever in brake applying position, release means carried by said lever and connected to said setting means, a release cable connecting said drum and said release means and arranged to be taken up equally with the first-mentioned cable upon the rotation of said drum, and means adapted to co-act with said release cable to further and separately take up said release cable in a manner to actuate said release means to cause the withdrawal of said setting means from co-action with said locking bar.

7. In a trailer brake control mechanism, a fulcrumed brake lever operatively connected to the trailer brakes, yieldable means adapted to normally maintain said lever in brake-release position, a rotatable drum, flexible connecting means between said drum and said lever, an operating lever normally disengaged from said drum, means adapted to cause co-acting engagement between said operating lever and said drum whereby movement of said operating lever rotates said drum in a manner to wind said flexible connecting means thereupon and thereby move said brake lever into brake-applying position, and brake setting means independent of said drum and adapted to co-act with said brake lever to retain said brake lever in brake-applying position whereby said operating lever is capable of being subsequently disengaged from said drum without affecting said setting means.

8. In a trailer brake control mechanism, a fulcrumed brake lever operatively connected to the trailer brakes, yieldable means adapted to normally maintain said lever in brake-release position, a rotatable drum, flexible connecting means between said drum and said lever, an operating lever normally disengaged from said drum, means adapted to cause co-acting engagement between said operating lever and said drum whereby movement of said operating lever rotates said drum in a manner to wind said flexible connecting means thereupon and thereby move said brake lever into brake-applying position, brake-setting means independent of said drum and adapted to co-act with said brake lever to retain said brake lever in brake-applying position whereby said operating lever is capable of being subsequently disengaged from said drum without affecting said setting means, and means adapted to retain said flexible connecting means in a taut condition after such subsequent disengagement.

9. In a trailer brake control mechanism, a brake lever operatively connected to the trailer brakes, yieldable means adapted to normally maintain said lever in brake-release position, a rotatable drum, flexible connecting means between said drum and said lever, an operating lever adapted to engage said drum whereby movement of said operating lever rotates said drum in a manner to wind said flexible means on said drum and thereby move said brake lever into brake-applying position, brake setting means adapted to co-act with said brake lever to retain said brake lever in brake-applying position, flexible brake-releasing connecting means between said drum and said setting means adapted to be wound on said drum upon rotation thereof, and means adapted to impart an additional tension to said releasing connection whereby said setting means is actuated to allow said yieldable means to return said brake lever to brake-release position.

10. In a trailer brake control mechanism, a brake lever operatively connected to the trailer brakes, yieldable means adapted to normally maintain said lever in brake-release position, a rotatable drum, flexible connecting means between said drum and said lever, an operating lever adapted to engage said drum whereby movement of said operating lever rotates said drum in a manner to wind said flexible means on said drum and thereby move said brake lever into brake-applying position, brake setting means adapted to co-act with said brake lever to retain said brake lever in brake-applying position, flexible brake-releasing connecting means between said drum and said setting means and adapted to be wound on said drum upon rotation thereof, means co-acting with said drum and adapted to normally maintain both of said flexible connecting means under uniform tension, and means adapted to impart an additional tension to said releasing connection whereby said setting means is actuated to allow said yieldable means to return said brake lever to brake-release position.

11. In combination with a leading vehicle and a trailer coupled thereto, brakes operatively connected to the wheels of the trailer, brake applying means on the trailer, releasable brake setting means on the trailer adapted to coact with said applying means to retain brake application, a flexible member connected to the applying means, said flexible member leading to and being operable from the leading vehicle, means on the trailer adapted to release said setting means, a second flexible member connected to the releasing means and extending to and being operable from the leading vehicle, and yieldable take-up means adapted to maintain said flexible members in a taut condition.

12. In combination with a leading vehicle and a trailer coupled thereto, brakes operatively connected to the wheels of the trailer, brake applying means on the trailer, flexible connective means between the applying means and the leading vehicle, means on the leading vehicle for exerting a pull on the connective means to effect brake application, releasable brake setting means on the trailer and adapted to retain brake application, flexible connective means between the setting means and the leading vehicle, yieldable take-up means common to the two connective means for maintaining them in a taut condition, and means for moving the second connective means independently of the first connective means to release said brake setting means.

13. In combination with a leading vehicle and a trailer coupled thereto, brakes operatively connected to the wheels of the trailer, brake applying means on the trailer, flexible connective means between the applying means and the leading vehicle, means on the leading vehicle for exerting a pull on the connective means to effect brake application, releasable brake setting means on the trailer and adapted to retain brake application, flexible connective means between the setting means and the leading vehicle, yieldable take-up means for maintaining the two connective means in a taut condition, and means for moving the second connective means independently of the first connective means to release said brake setting means.

14. In a trailer brake control mechanism, a brake lever operatively connected to the trailer brakes, yieldable means adapted to normally maintain said lever in brake-release position, a rotatable drum, flexible connecting means between said drum and said lever, an operating lever adapted to engage said drum whereby movement of said operating lever in one direction rotates said drum in a manner to wind said flexible means on said drum and thereby move said brake lever into brake-applying position, brake setting means adapted to coact with said brake lever to retain said brake lever in a brake-applying position, flexible brake-releasing connecting means between said drum and said setting means adapted to be wound on said drum upon rotation thereof, means adapted to impart an additional tension to said releasing connection whereby said setting means is actuated to allow said yieldable means to return said brake lever to brake-release position; and means for disengaging the operating lever from the drum when the lever is moved in the opposite direction.

15. In combination with a leading vehicle and a trailer coupled thereto, a brake lever operatively connected to the trailer brakes, a pair of relatively movable members on the leading vehicle, releasable means for interconnecting said members to hold them against relative movement, yieldable means normally adapted to hold said releasable means in operative position, means adapted to move said releasable means into operative interconnecting position; flexible connecting means between said brake lever and one of said members whereby, when said releasable means is in operative position, movement in one direction of said one member by movement of the other member effects a pull on the flexible means to move the brake lever to brake applying position, and means adapted to coact with and return said releasable means to inoperative position when said other member is subsequently moved in the opposite direction.

16. In combination with a leading vehicle and a trailer coupled thereto, brakes operatively connected to the wheels of the trailer, brake applying means on the trailer, a drum rotatably mounted on the leading vehicle, a cable connecting said drum and said brake applying means, means for rotating the drum to take up said cable in a manner to operate the brake applying means, releasable setting means on the trailer for retaining brake application, a release cable connecting said drum and said release means and arranged to be taken up equally with the first mentioned cable upon rotation of the drum, and means for taking the release cable up independently of the other cable and thereby releasing said setting means.

17. In combination with a leading vehicle and a trailer coupled thereto, brakes operatively connected to the wheels of the trailer, brake applying means on the trailer, a rotatable drum on the leading vehicle, a cable connecting the drum and applying means, releasable manually operated means for rotating the drum in one direction to take up the cable and thereby operate the applying means, and brake setting means on the trailer and adapted to retain the brakes in applied condition; the drum being capable of rotation in either direction, when the brakes are so retained and when the manually operated means is out of operation, without affecting the setting means.

18. In combination with a leading vehicle and a trailer coupled thereto, brakes operatively connected to the wheels of the trailer, brake applying means on the trailer, a rotatable drum on the leading vehicle, a cable connecting the drum and applying means, a relatively strong spring on the trailer, said spring being normally adapted to maintain the brakes in release position and yieldably resisting movement of the cable in one direction and thereby resisting rotation of the drum in one direction, a relatively weak spring on the leading vehicle and adapted to yieldably resist rotation of the drum in the opposite direction, releasable manually operated means on the leading vehicle adapted to rotate the drum in said one direction to take up the cable and thereby operate the applying means, brake setting means on the trailer and adapted to retain the brakes in applied condition against the action of said stronger spring, and, when the brakes are so retained and when the manually operated means is out of operation, the weaker spring being adapted to rotate the drum in said one direction to take up slack as it develops in the cable and yielding to allow rotation of the drum in the opposite direction to pay out cable when separative movement occurs between leading vehicle and trailer.

19. In a trailer brake control mechanism, brakes operatively connected to the wheels of the trailer, brake applying means on the trailer and connected to the brakes, a rotatable drum, flexible connecting means between said drum and applying means, means for rotating the drum to wind said cable thereupon and thereby operate the applying means, releasable brake setting means adapted to retain application of the brakes, flexible brake releasing connecting means between said drum and said setting means, said releasing means being adapted to be wound on the drum upon rotation thereof, a spring coacting with the drum and adapted to maintain both of said connecting means normally under uniform tension, and means adapted to impart additional tension to said releasing connection for moving the setting means to release position.

20. In a trailer brake control mechanism, a rotatable drum, a cable secured to the drum and operatively connected to the trailer brakes, a spring adapted to rotate said drum in a manner to yieldingly take up the cable, and disengageable and manually operated means for rotating the drum in a manner to take up the cable positively.

21. In combination with a leading vehicle and a trailer coupled thereto, brake applying means on the trailer and operatively connected to the trailer brakes, a rotatable drum on the leading vehicle, a cable operatively connecting the drum and brake applying means, and a spring on the leading vehicle adapted to rotate the drum in one direction in a manner to take up the cable when slack develops therein and to yield and allow the drum to rotate in the opposite direction when separative movement occurs between leading vehicle and trailer.

22. In combination with a leading vehicle and a trailer coupled thereto, brake applying means on the trailer and operatively connected to the trailer brakes, releasable brake setting means on the trailer, a rotatable drum on the leading vehicle, a cable connecting said drum and brake releasing means, a spring coacting with the drum for yieldingly resisting its rotation in one direction and thereby maintaining the cable in a taut condition, and means adapted to take up the cable between the drum and setting means and thereby release the setting means.

23. In combination with a leading vehicle and a trailer coupled thereto, brake applying means on the trailer and operatively connected to the trailer brakes, brake setting means on the trailer, a relatively weak spring adapted to maintain the setting means releasably in operative position, a rotatable drum on the leading vehicle, a cable connecting the drum and the setting means, a relatively strong spring coacting with the drum for yieldingly resisting its rotation in one direction and thereby maintaining the cable normally under predetermined tension, and means between said springs adapted to tension the cable with added force, thereby withdrawing the setting means from operative position against the action of the weaker spring.

In witness that I claim the foregoing I have hereunto subscribed my name this 19th day of March 1923.

ANDREW L. PARRISH.